(12) United States Patent
Petersen et al.

(10) Patent No.: US 6,406,623 B2
(45) Date of Patent: *Jun. 18, 2002

(54) TANGENTIAL FLOW FILTRATION APPARATUS

(75) Inventors: Cristopher Petersen, Amherst, NH (US); Boris Pesakovich, Brookline, MA (US)

(73) Assignee: Millipore Corporation, Bedford, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/856,856

(22) Filed: May 15, 1997

(51) Int. Cl.[7] .............................................. B01D 61/18
(52) U.S. Cl. ................. 210/195.2; 210/257.1; 210/257.2; 210/321.6; 210/321.84; 210/321.87; 210/321.72; 210/456
(58) Field of Search ........................... 210/257.1, 257.2, 210/195.2, 456, 321.6, 321.84, 321.87, 321.72

(56) References Cited

U.S. PATENT DOCUMENTS

| | | | | |
|---|---|---|---|---|
| 3,567,031 A | * | 3/1971 | Loeffler | |
| 3,893,920 A | * | 7/1975 | Hubbard et al. | 210/197 |
| 4,743,372 A | * | 5/1988 | Kumagai et al. | 210/195.2 |
| 5,160,433 A | * | 11/1992 | Niesen | 210/321.84 |
| 5,240,612 A | * | 8/1993 | Grangeon et al. | 210/636 |

OTHER PUBLICATIONS

Pall internet website, information obtained regarding Ultrareservoir systems, 8 pages, Apr. 2000.*
AGT Catalog, p. 20, Publication Date Unknown.
Amicon Catalog, pp. 53–54, Publication Date Unknown.
Pall Filtron Catalog, pp. 48–51, Publication Date: 5/92.
Millipore Pharm–Bio Catalog, pp. 168–169, Publication Date: 4/95.

* cited by examiner

*Primary Examiner*—John Kim
(74) *Attorney, Agent, or Firm*—John Dana Hubbard; Paul J. Cook (57) ABSTRACT

A tangential flow filtration apparatus is provided which includes a liquid feed reservoir and a tangential flow filtration module connected together by manifolds. The manifolds eliminate the need for tubular conduits, thereby effecting a reduction in recirculation volume for the apparatus.

1 Claim, 7 Drawing Sheets

TANGENTIAL FLOW FILTRATION APPARATUS

BACKGROUND OF THE INVENTION

1. Field of the Invention

This invention relates to a tangential flow filtration apparatus which includes a manifold system which effects small recirculation volumes.

2. Description of Prior Art

Tangential flow filtration (TFF) systems presently are commonly utilized to filter liquids to produce a permeate and a retentate. Liquid feed is directed tangentially across a porous membrane surface which is supported by a porous support such as a screen. The permeate and retentate then are recovered as separate streams.

TFF systems are commonly used to process biological liquids in order to concentrate biological molecules in a retentate for further study or use. It is not unusual that the biological molecules are present in the feed liquid in low concentrations. Thus, it is desirable to selectively separate a maximum volume of carrier liquid from the biological molecule of interest to maximize the concentration of the biological molecule in the retentate. This condition, in turn, facilitates further study or use of the biological molecule.

Presently available TFF apparatus are formed of a plurality of elements, including a pump, a feed solution reservoir, a filtration module and conduits for connecting these elements. In use, the feed solution is directed from the feed solution reservoir to the filtration module while the retentate from the filtration module is recirculated from the filtration module to the feed solution reservoir until the desired volume of retentate is obtained. The conduits each require an individual fitting. Assembly of the individual fittings to individual conduits is undesirably time consuming. In addition, when the total internal volume of the conduits used in the apparatus is increased, the recirculating volume of liquid is undesirably increased. It is desirable to minimize this recirculation volume in order to maximize the concentration of the product in the retentate. For example, the Ultralab system available from Pall-Filtron Corporation, East Hills, N.Y., has a minimum recirculation volume of 20–25ml when conduit lengths of the system are minimized. Also, the Amicon CH2 System available from Millipore Corporation, Bedford, Mass. has a minimum recirculation volume of 100 ml.

Accordingly, it would be desirable to provide a tangential flow filtration system which provides a reduced recirculation volume as compared to presently available tangential flow filtration systems. Such a system would permit maximizing the concentration of molecules of interest in a retentate stream thereby facilitating use or analysis of the molecules of interest. In addition, such a system would allow obtaining the same factors of the concentration of the molecules of interest with smaller starting volumes.

SUMMARY OF THE INVENTION

The present invention provides a tangential flow filtration apparatus which includes a reservoir for a fluid feed and a tangential flow filtration module which are connected together through manifolds. A pump is provided to direct fluid feed from the reservoir, through a manifold and into the filtration module where the fluid feed is separated to form a permeate and a retentate. The permeate is removed from the filtration module and recovered or discarded. The retentate is recycled to the reservoir through the second manifold so that it can be redirected into the filtration module. Pressure within a retentate conduit in fluid communication with the retentate exiting from the filtration module can be adjusted, such as with a valve to provide more uniform pressure drop through the membrane along the length of one or more filtration membranes positioned within the filtration module. The pump can be utilized as a unit separate from the reservoir and the filtration module or it can be formed integrally with the reservoir or with a support structure for the reservoir.

The tangential flow filtration apparatus of this invention eliminates the need for flexible tubular conduits from the filtration module to the liquid feed reservoir by utilizing a manifold formed integrally with the reservoir. This structure, in turn, permits providing a small minimum recirculation volume as compared to the filtration systems of the prior art which require the use of tubular conduits. In addition, the length of flexible tubular conduits can be minimized from the liquid feed reservoir to the filtration module by a second manifold formed integrally with the reservoir. Flexible tubular connections from the liquid feed reservoir to the filtration module can be eliminated when the pump is formed integrally with the reservoir or with a support for reservoir.

DESCRIPTION OF SPECIFIC EMBODIMENTS

Tangential flow filtration modules in the apparatus of this invention can be formed from any conventional membrane configuration or membrane-spacer configuration. For example, the membrane can be formed of a hollow membrane fiber, a flat membrane sheet or a spirally wound membrane sheet. The requirements of the filtration module is that it effects filtration of a liquid feed stream to produce a permeate stream and a retentate stream. The feed, retentate and permeate ports are arranged so that incoming liquid feed to the filtration apparatus enters a feed channel, passes through the feed spacer layers, when present, and either passes through a membrane to form a permeate stream or is retained by a membrane to form a retentate stream. The retentate stream is removed from the filtration apparatus through a retentate port and the permeate stream is removed from the filtration apparatus from one or more permeate ports. When using hollow fiber membranes, feed spacer layers are not present. The membranes utilized in the filtration module can be an ultrafiltration membrane, a microporous membrane, a nanofiltration membrane or a reverse osmosis membrane.

Representative suitable membrane filters are ultrafiltration, microporous, nanofiltration or reverse osmosis filters formed from polyvinylidene fluoride (PVDF), polysulfone, polyethersulfone, regenerated cellulose, polyamide, polypropylene, polyethylene, polytetrafluoroethylene, cellulose acetate, polyacrylonitrile, vinyl copolymer, polyacrylonitrile, vinyl copolymer, polyacrylonitrile, vinyl copolymer, polycarbonate, PFA, blends thereof or the like. Suitable polymeric sealing compositions are those which provide the desired sealing configuration within the filtration apparatus and do not significantly degrade the elements forming the apparatus including the membranes, spacer layer ports and housing elements. In addition, the sealing composition should not degrade or provide a significant source of extractables during the use of the apparatus. Representative suitable sealing compositions are thermoplastic polymer compositions including those based on polypropylene, polyethylene, PFA, PVDF, polysulfones, polyethersulfone, polycarbonate, acrylonitrile-butadiene-styrene (ABS), polyester, blends thereof, filled or unfilled or the like.

Figure 1:
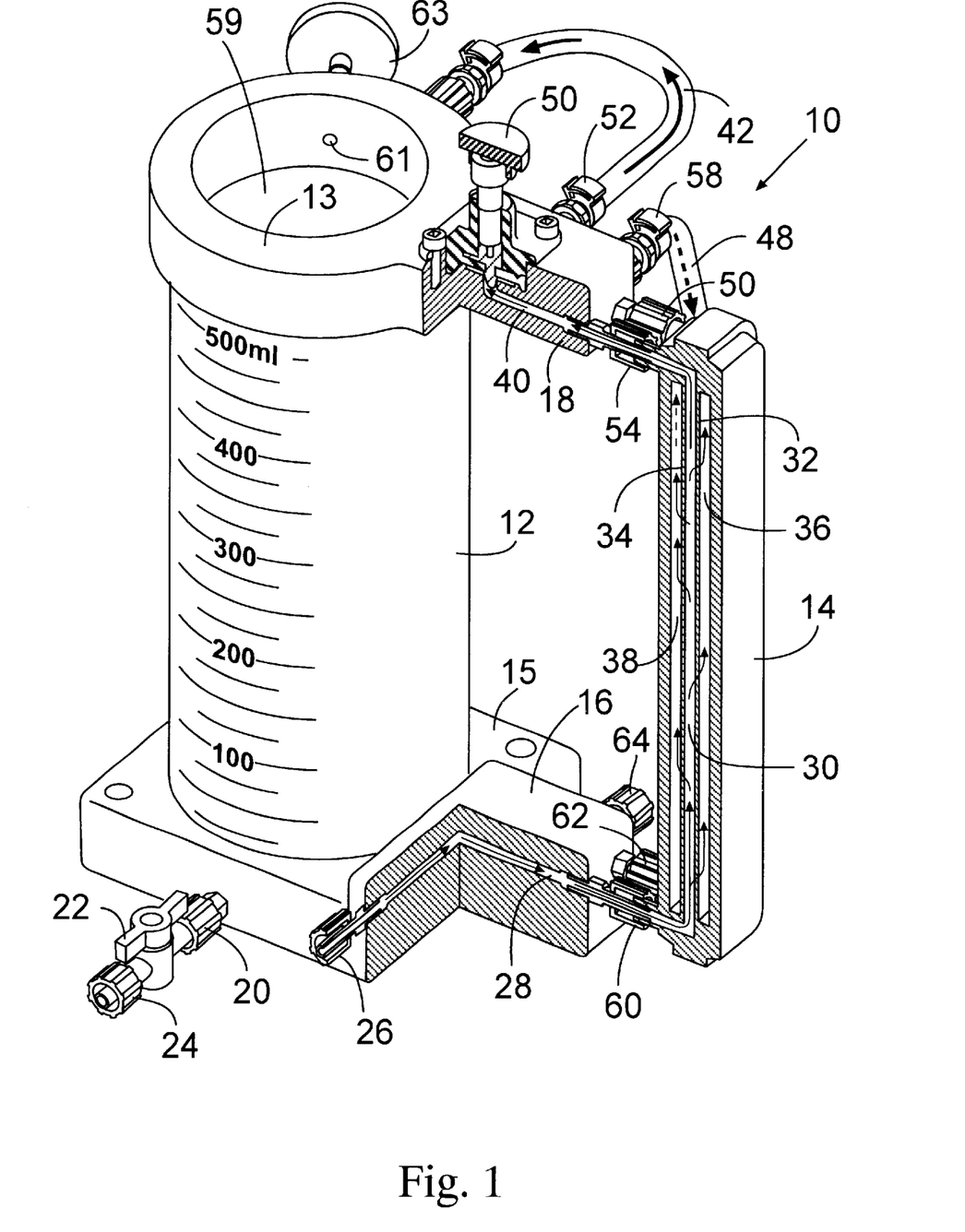
FIG. 1 is an isometric view, in partial cross-section, taken along a retentate stream path, of a tangential flow filtration apparatus of this invention.
Figure 2:
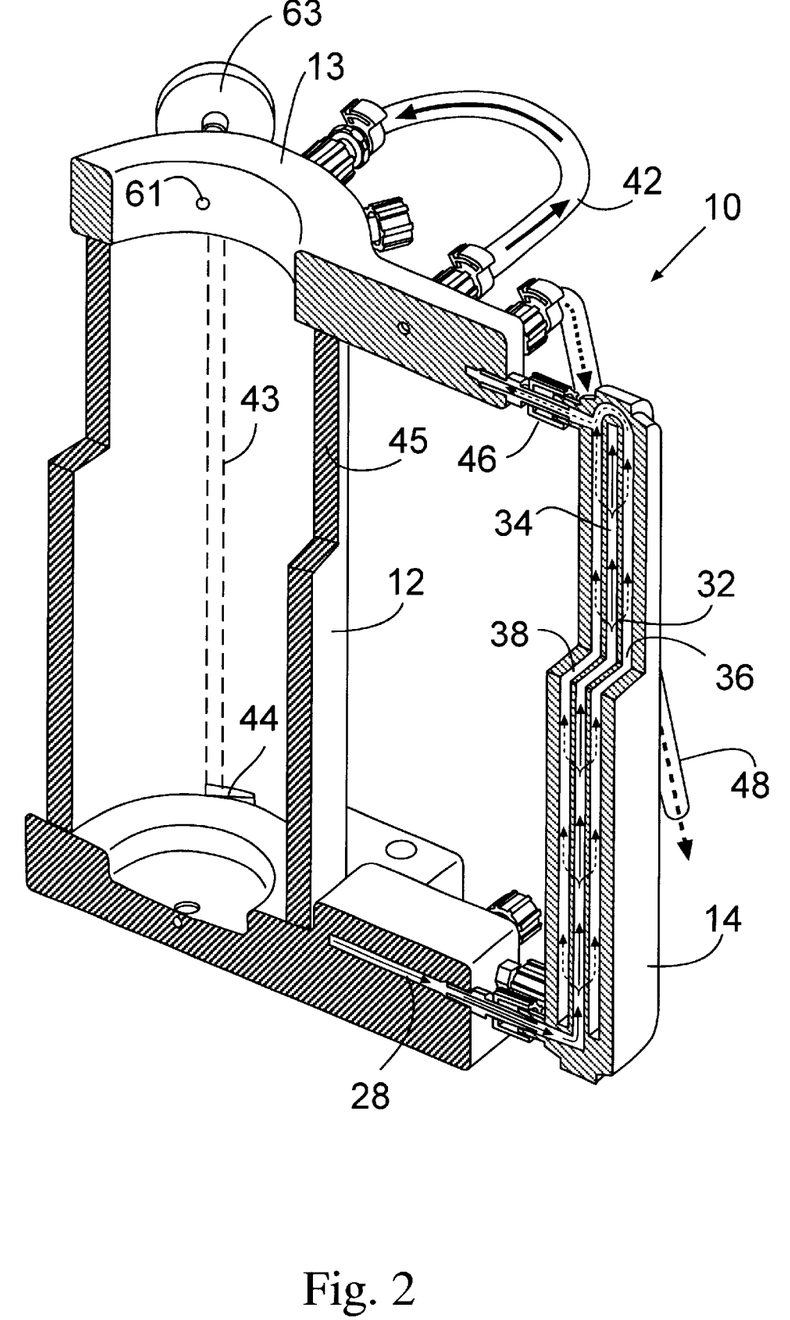
FIG. 2 is a cross-sectional view, taken along a permeate stream path and a partial retentate stream path, of the apparatus of FIG. 1.

Referring to FIGS. 1 and 2, the tangential flow filtration apparatus 10 of this invention includes a liquid feed reservoir 12, a tangential flow filtration module 14 and two manifolds 16 and 18 which provide fluid communication between the reservoir 12 and module 14. The manifold 18 is formed integrally with the reservoir 12 or it can be formed integrally with a separate flange element 13 which can be fit onto a top portion of reservoir 12. Flange element 13 and reservoir 12 can be formed integrally as a unitary structure. A connector 20 is in fluid communication with reservoir 12 and connector 24 is in fluid communication with a pump (not shown) such as with a tubular conduit (not shown) when valve 22 is open. Manifold 16 if formed integrally with a support 15 for reservoir 12 as shown. Alternatively, manifold 16 can be formed integrally with reservoir 12 to form a unitary structure. The manifolds 16 and 18 are formed integrally with the reservoir 12 or with elements which interface with the reservoir 12 rather than with the filtration module 14 because the filtration module 14 is periodically replaced rather than replacing the reservoir 12. Connector 26 is in fluid communication with the pump (not shown) when it is secured to a tubular conduit (not shown) which, in turn, is in fluid connection with the pump.

As used herein, the phrase "formed integrally" refers to a manifold structure gauge or pump which is formed as a unitary structure directly with the feed reservoir or with an element which is directly attached to the reservoir or which supports the reservoir so that the need for separate tubular conduits is eliminated.

The connector 26 is in fluid communication with feed channel 28 for delivery of feed liquid through manifold 16. Manifold 16 eliminates the need for a tubular conduit and provides a permanent means for feeding liquid to the filtration module 14. Feed liquid passes into filtration module 14 through feed channel 30 to effect tangential flow filtration through membranes 32 and 34. Permeate passes through membranes 32 and 34 and enters permeate channels 36 and 38. Unfiltered retentate passes into retentate channel 40 to be passed through retentate tubular conduit 42 and to be recycled to reservoir 12 through conduit 43 and opening 44. Conduit 43 is formed, such as by drilling, within wall 45 of reservoir 12. Alternatively, conduit 43 can be attached to the wall 45 of reservoir 12. Since conduit 43 is vertically positioned, it does not contribute to hold up volume as liquid therein will drain into reservoir 12 when pumping ceases. Permeate passes into permeate channel 46 and permeate tube 48 to be collected or discarded. A valve 50 can be provided to control pressure over the surfaces of membranes 32 and 34. The valve 50 can be adjusted to create a back pressure in retentate stream 30.

The manifolds 16 and 18 provide permanent connectors between filtration module 14 and reservoir 12. The manifold 18 can support retentate connectors 52 and 54 as well as permeate connectors 56 and 58. This manifold 18 provides a compact means which minimizes the volume of liquid therein while providing the desired fluid connection. Manifold 16 is provided with feed connector 60 and permeate connectors 62 and 64, and also provides a compact means for effecting the desired fluid connections without the need for tubular conduits.

When the opening 59 of reservoir 12 is sealed, air can enter reservoir 12 through port 61 (which is sealed by a filter housing 63 including an air filter (not shown). The air filter used is a conventional sterilizing filter. The incoming air to the reservoir can be rendered sterile when the filter used is a conventional sterilizing filter. The incoming air replaces discarded permeate thereby permitting continuing filtration.

Figure 3:
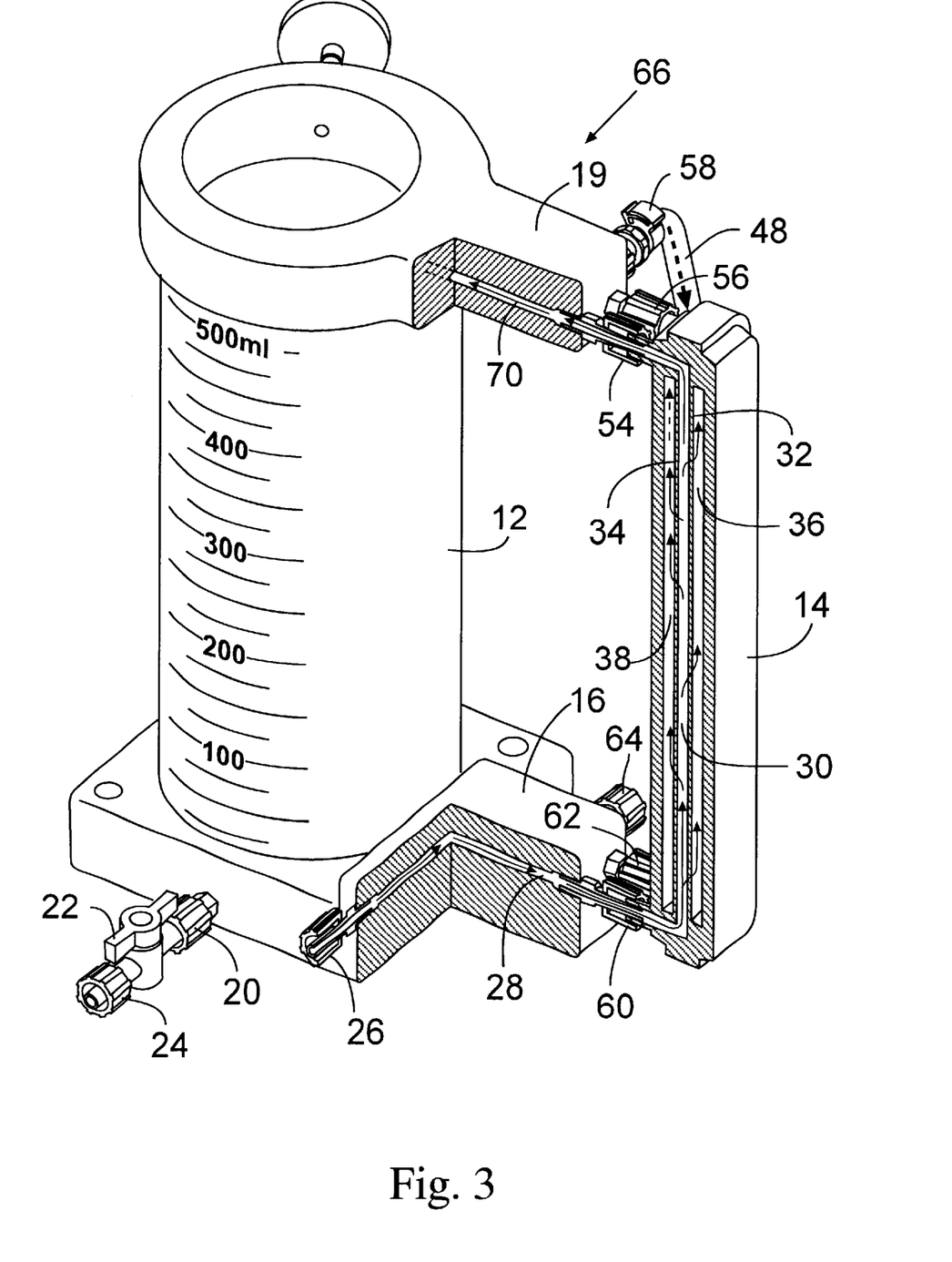
FIG. 3 is an isometric cross-sectional view, taken along a retentate stream path, of an alternative embodiment of this invention.

FIG. 3 illustrates an alternative embodiment 66 of this invention where like elements are identified by the same reference numerals to the elements of FIGS. 1 and 2. The embodiment shown in FIG. 3 eliminates the conduit 42 shown in FIGS. 1 and 2. The conduit 42 shown in FIGS. 1 and 2 provides an advantage of straight through flushing, liquid sampling or liquid recovery, while also having the disadvantage of increasing the minimum volume of the apparatus 10. The conduit 49 can be replaced by a three way valve which can direct retentate to either reservoir 12 by a passageway (not shown) through the reservoir wall 45 or through connector 52 to permit retentate sampling. The use of such a three way valve eliminates liquid hold-up within conduit 42. As shown in FIG. 3, manifold 19 differs from manifold 18 of FIGS. 1 and 2 in that the retentate channel 70 provides liquid flow directly from retentate channel 30 into reservoir 12. The retentate channel 70 of FIG. 3 eliminates the need for the tubular conduit 42 or FIGS. 1 and 2. Thus, the embodiment shown in FIG. 3 provides even less recirculation volume than the embodiment shown in FIGS. 1 and 2.

The embodiment shown in FIGS. 1 and 2 is useful when an outlet 44 for the recycled retentate positioned at the bottom of reservoir 12 is utilized. The conduit 42 for retentate liquid also can be utilized for wash liquid when it is desired to flush the liquid path for the retentate including a channel which connects the conduit 42 and the outlet 44. The embodiment shown in FIG. 3 is particularly desirable when recycle of retentate is effected to a top portion of reservoir 12.

Figure 4:
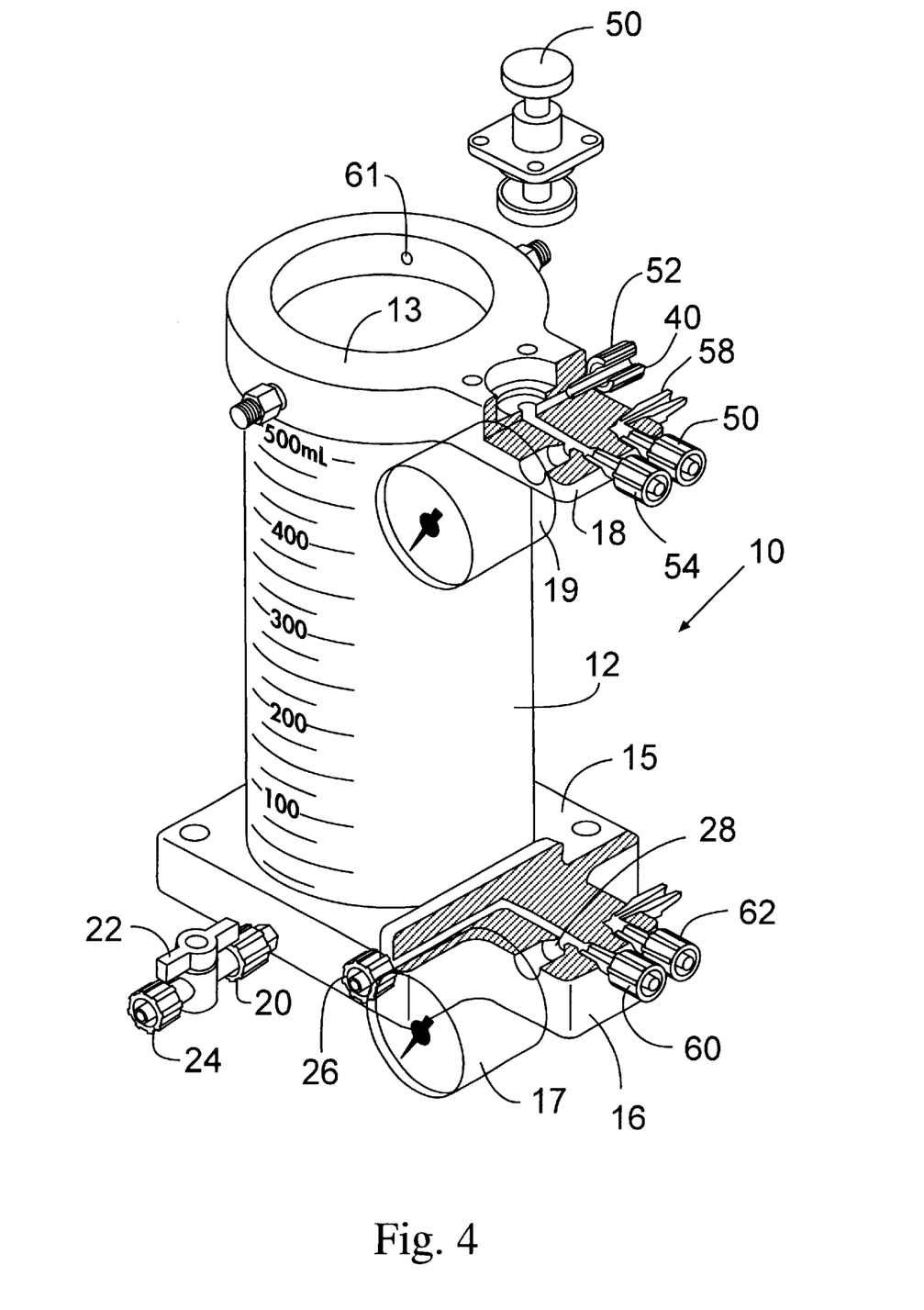
FIG. 4 is an isometric cross-section view of the apparatus of FIG. 1, including pressure gauges.

In FIG. 4, like elements to the elements of FIGS. 1 and 2 are referred by the same reference numbers. As shown in FIG. 4, the filtration apparatus 10 includes pressure gauges 17 and 19. Pressure gauge 19 monitors fluid pressure within retentate channel 40 which provides a guide for adjusting valve 50 to adjust back pressure in retentate stream 30 (FIG. 1). Pressure gauge 17 monitors fluid pressure within feed channel 28, thereby to provide a guide for adjusting fluid pressure provided by a pump (not shown) in fluid communication with feed channel 28 through connector 26. Thus gauges 17 and 19 provide a convenient means for regulating the filtration processes. In addition, since the gauges 17 and 19 are integrally formed with manifolds 16 and 18, any hold up volume introduced by the gauges 17 and 19 is minimized.

Figure 5:
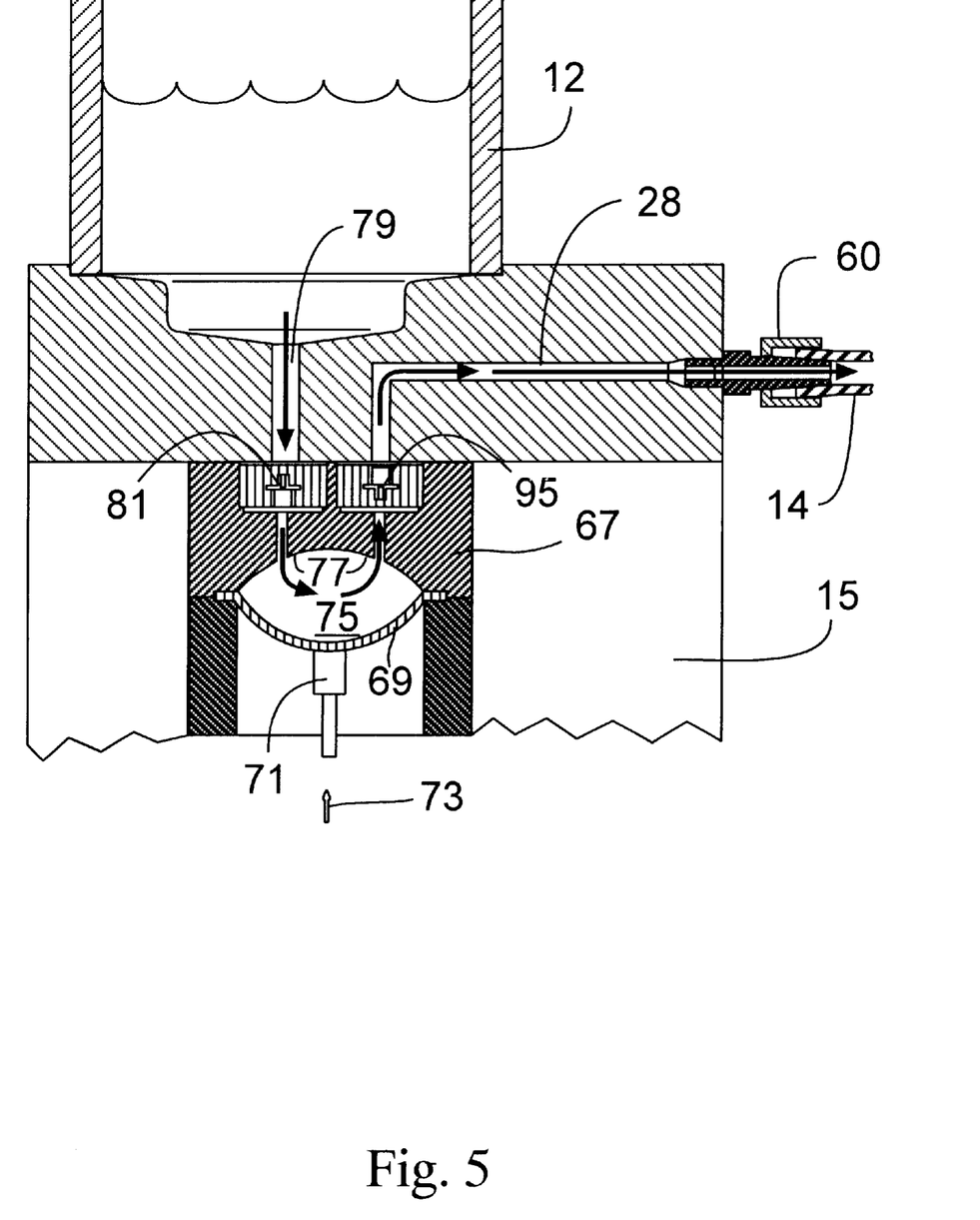
FIG. 5 is a partial cross-section view of an embodiment of the apparatus of this invention including a pump.

FIG. 5 illustrates an alternative embodiment of this invention wherein a pump for introducing a feed liquid into a filtration module is integrally formed with a support structure for a reservoir for feed liquid and/or retentate. The pump 67 includes a diaphragm 69 attached to a reciprocating rod 71. The rod 71, in turn, is attached to a motor (not shown) which causes the rod to reciprocate in the directions illustrated by two-way arrow 73. In the diaphragm position shown in FIG. 5, the plenum volume 75 between diaphragm 69 and seat 77 is filled with liquid from reservoir 12 through channel 79 and valve 81. When the diaphragm 69 is reciprocated toward seat 77, valve 81 is closed and valve 95 is open so that liquid within volume 75 is passed through valve 95, feed channel 28, fitting 60 and into a filtration module 14. When diaphragm 69 is reciprocated away from seat 77, valve 95 is closed and valve 81 is open to permit liquid from reservoir 12 to fill volume 75. By positioning pump 67 to be formed integrally with reservoir support 15, tubular conduits from the pump to either the reservoir or the filtration module are eliminated.

Figure 6:
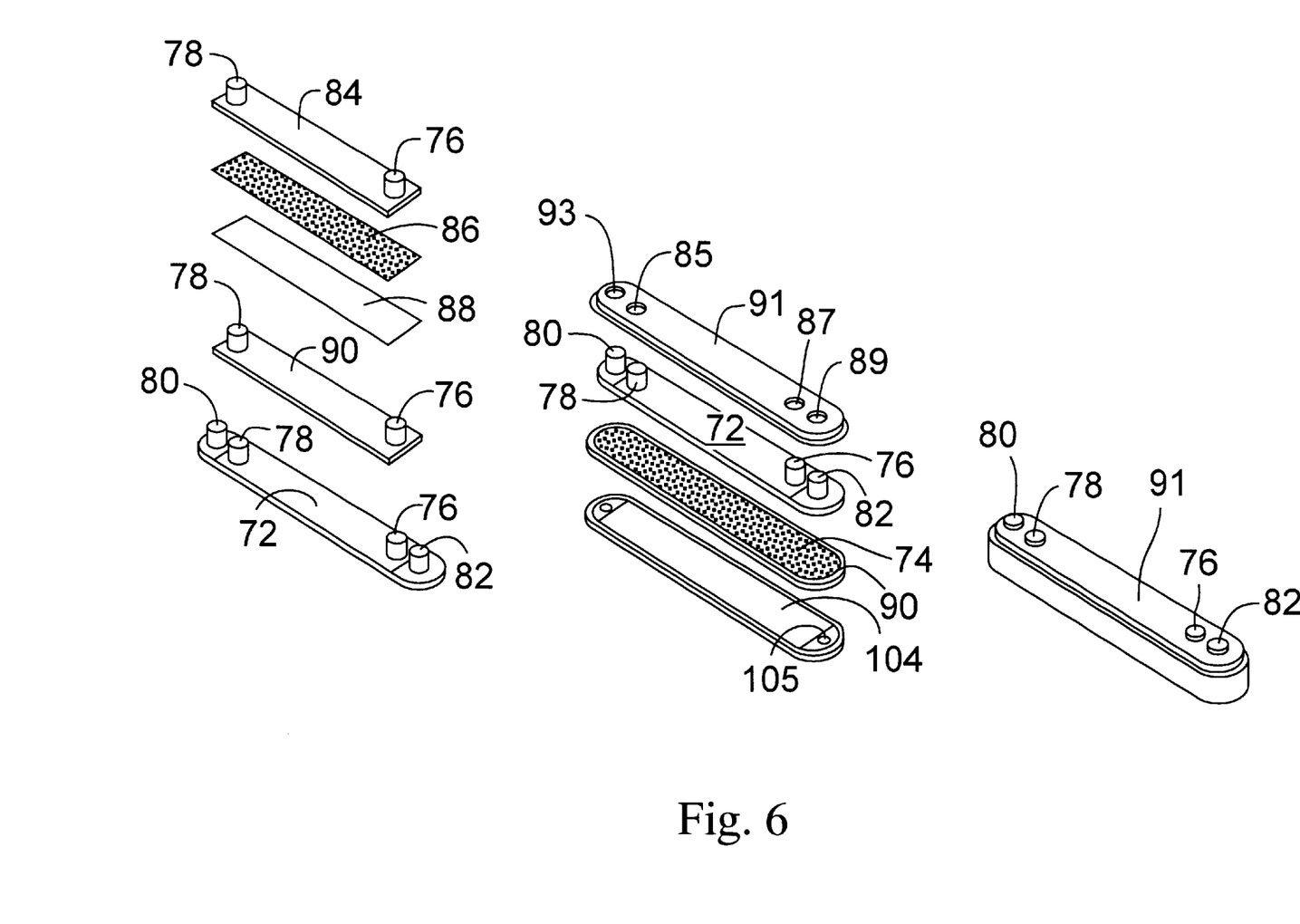
FIG. 6 is an exploded view of a tangential flow filtration module usefull in the present invention.

FIG. 6 illustrates one method for making a conventional tangential flow filtration module. The membrane filtration module 70 is formed from modules 72 and 104 and a feed spacer layer 74. The filtration module 70 is formed from module 72 which includes two permeate outlet ports 76 and 78, a feed inlet port 80 and a retentate outlet port 82. The module 72 is formed from an end cap 84, permeate screen 86 and a membrane 88. In the first step, the end cap 84, permeate screen 86 and membrane 88 are placed into a mold and are presealed to form a first overmolded element 90. The overmolded element 90 then is placed in a second mold and a plastic composition is molded about overmold element 90 to form second overmolded element 72, including retentate outlet port 82, feed inlet port 80 and end cap 91. End cap 91 has holes 83, 85, 87 and 89 to accommodate ports 76, 78, 80 and 82. The feed spacer 74 is formed by molding a rib 90 about the screen 74. Module 104 also is formed from an end cap 105, a permeate screen 86 and a membrane 83 in the same manner as module 72. Suitable seals are provided, such as with an adhesive, solvent bonding, ultrasonic welding or the like to assure that permeate does not mix with feed or retentate while permitting formation of a permeate stream and a retentate stream.

Figure 7:
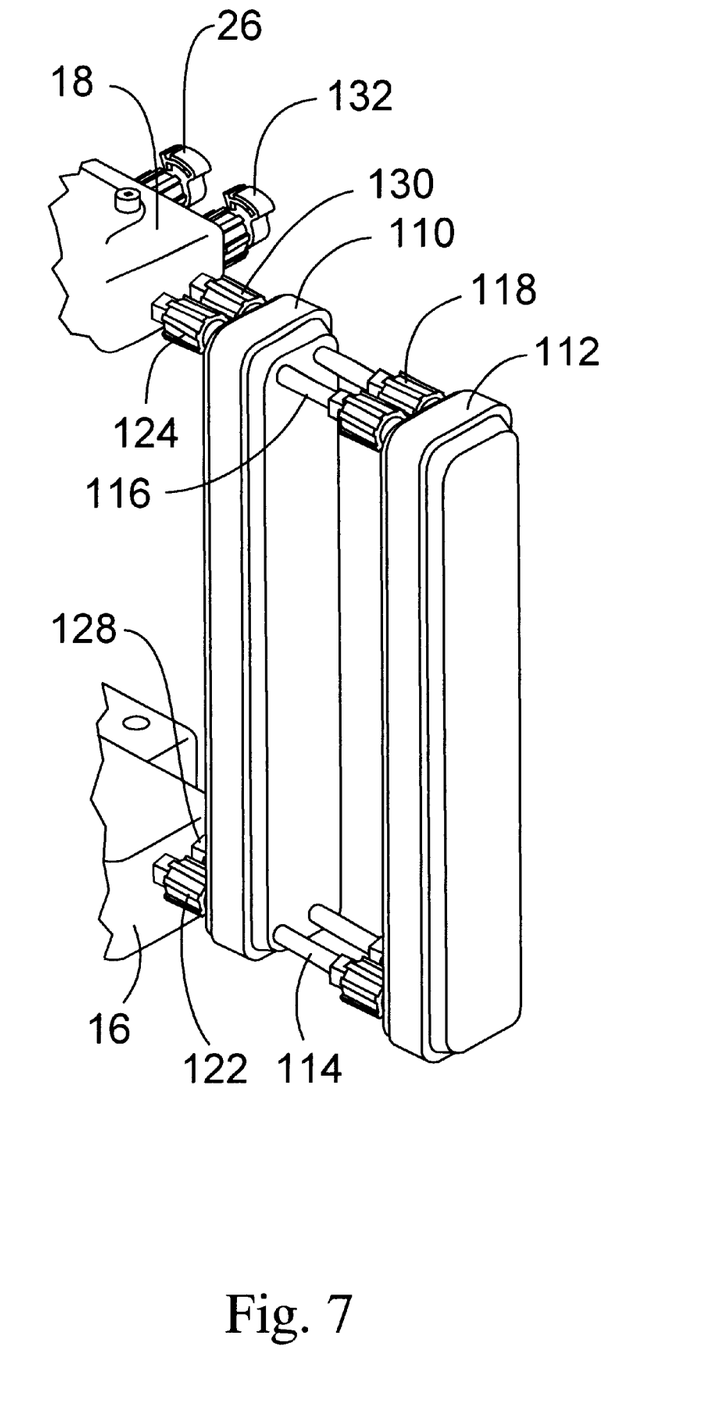
FIG. 7 is a partial isometric view of the apparatus of this invention utilizing a plurality of filtration modules.

Referring to FIG. 7, two filtration modules 110 and 112 are shown connected to each other by feed connection 114, retentate connection 116 and permeate connections 118 and 120. Feed from manifold 16 enters modules 110 and 112 through connections 122 and 114. Retentate is removed from the modules 110 and 112 through connections 116, 124 and 126. Permeate is removed from modules 110 and 112 through connections 120, 128, 118, 130 and 132. The apparatus shown in FIG. 7 provides increased filtration capacity as compared to an apparatus utilizing a single filtration module.

When operating the filtration apparatus 10 of FIGS. 1 and 2, liquid in reservoir 12 is pumped through connector 24 by a pump (not shown) and is directed through connector 26 into feed channel 28. Feed liquid is filtered through membranes 32 and 34 to form a retentate which passes through channel 40 and a permeate which passes through connector 50 into permeate conduit 48. Retentate passes through tube 42, through outlet 44 and into reservoir 12 from which it is recycled through the fluid path described above.

What is claimed is:

1. A tangential flow filtration apparatus comprising:

a reservoir for a liquid having a cylindrical tubular shape and having, in its upright position, a top open end and a bottom end;

a tangential flow filtration module comprising a housing enclosing an ultrafiltration sheet membrane and provided with a feed inlet, a retentate outlet and at least one permeate outlet, said at least one tangential flow filtration module separating a fluid feed into a retentate stream and a permeate stream, all of said inlets and outlets being integral with said housing;

a first manifold providing fluid communication for said fluid feed between said reservoir and said tangential flow filtration module, the first manifold being positioned immediately below and integral with said bottom end of said reservoir such that said first manifold forms a base upon which said reservoir is positioned, the first manifold provided with a channel extending from a top surface of said base downward through the first manifold;

a second manifold providing fluid communication for said retentate stream between said tangential flow filtration module and said reservoir, the second manifold being positioned immediately above and integral with the top open end of said reservoir;

and means for recirculating said liquid from said reservoir to said tangential flow filtration module, said means for recirculating including a pump for recirculating said liquid from said reservoir to said at least one filtration module, said pump being housed within a reservoir support, said reservoir support being positioned immediately below and integral with said first manifold, said pump being positioned to receive liquid passing through said downwardly extending channel from said reservoir;

wherein (a) said reservoir, said first manifold, said second manifold, and said reservoir support form a unitary assembly; and wherein (b) said liquid can be circulated directly from said reservoir to said first manifold, directly from said first manifold to said pump, directly from said pump to said tangential flow filtration module, directly from said tangential flow filtration module to said second manifold, and directly from said second manifold to said reservoir;

whereby the tangential flow filtration apparatus is capable of conducting said circulation with a volume of liquid less than 20 ml.

* * * * *